(12) United States Patent
Homer et al.

(10) Patent No.: US 7,362,315 B2
(45) Date of Patent: Apr. 22, 2008

(54) APPARATUS AND METHOD FOR DIGITIZER PEN CALIBRATION

(75) Inventors: Steven S Homer, Tombal, TX (US); James Scott Love, Magnolia, TX (US); Adnan Siddiquie, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 677 days.

(21) Appl. No.: 10/888,899

(22) Filed: Jul. 8, 2004

(65) Prior Publication Data

US 2006/0007186 A1    Jan. 12, 2006

(51) Int. Cl.
*G06F 3/033*     (2006.01)
(52) U.S. Cl. ..................... 345/179; 345/173
(58) Field of Classification Search ........ 345/173–183; 178/19.01–19.07; 702/101, 47; 715/863, 715/864

See application file for complete search history.

(56) References Cited

U.S. PATENT DOCUMENTS

| 4,786,765 | A | 11/1988 | Yamanami et al. |
| 6,195,446 | B1 * | 2/2001 | Skoog ........................ 382/119 |
| 2005/0030297 | A1 * | 2/2005 | Burstrom et al. ........... 345/179 |

OTHER PUBLICATIONS esp@cnet, "State Detection System For Position Indicator", http://v3.espacenet.com/textdoc?DB=PAJ&DIX=JP63056716, printed Jun. 29, 2004, pp. 1.
ACE Cad Enterprise Co. Ltd. "ACECAT 302", http://www.acecad.com.tw/eng/acecat302.htm, printed Jun. 4, 2004, pp. 3.
Fujitsu PC Corporation, "Pen Computer Technology", 2002, pp. 9.

* cited by examiner

*Primary Examiner*—Alexander Eisen
*Assistant Examiner*—Kenneth B Lee (57) ABSTRACT

A system for calibrating a digitizing pen applies a known actual pen force to a tip of the digitizing pen, infers an indicated pen force from a pen force signal sent by the digitizing pen, and computes a correction, based on the actual and indicated pen forces, to be applied to a future indicated force reading.

37 Claims, 8 Drawing Sheets

PEN MANAGEMENT APPLICATION

SELECT A PREVIOUSLY CALIBRATED PEN:

| | |
|---|---|
| MARY'S PEN | O |
| PEN NUMBER 3 | O |
| MY FAVORITE PEN | ☑ |

OR:

CALIBRATE OR RECALIBRATE
   A NEW OR EXISTING PEN      O

[ EXECUTE ]

APPARATUS AND METHOD FOR DIGITIZER PEN CALIBRATION

FIELD OF THE INVENTION

The present invention relates generally to pen-based information devices.

BACKGROUND OF THE INVENTION

Figure 1:
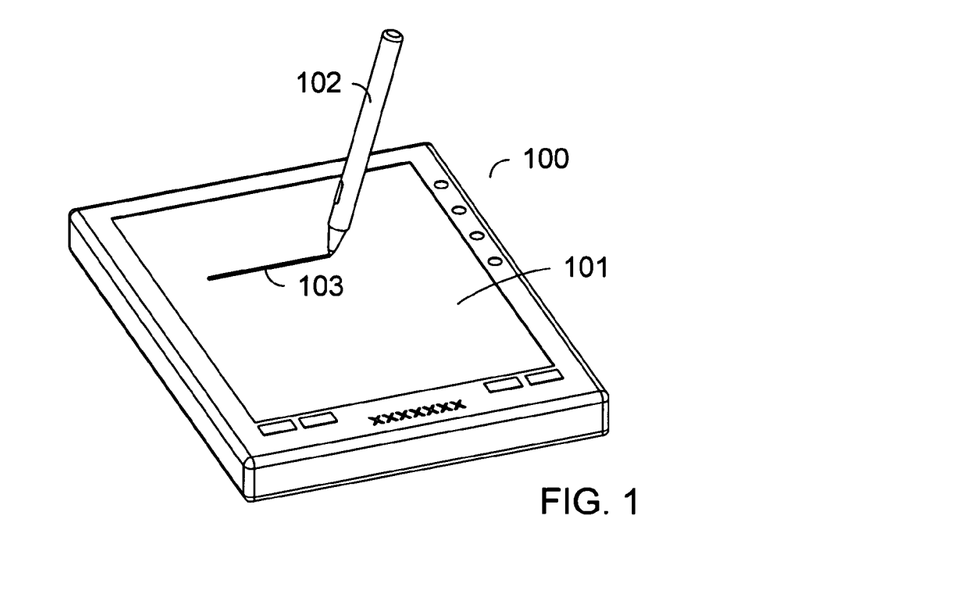
FIG. 1 illustrates a tablet computer.

FIG. 1 illustrates a tablet computer 100, which serves as an example pen-based electronic device. Tablet computer 100 comprises a writing surface 101, which serves as in input device when used in conjunction with pen 102. Tablet computer 100 can sense the location of touches of digitizing pen 102 on writing surface 101. Writing surface 101 may be touch sensitive, or other sensing means may be used.

One way the touch location information may be used is to enable entering of graphical information into tablet computer 100. For example, when programmed with appropriate software, tablet computer can record touches of digitizing pen 102 on writing surface 101, interpreting them as instructions for creating a drawing, and nearly simultaneously display a resulting drawing 103 on a display screen, which may be coincident with writing surface 101. Such a device may be called a digitizer.

In order to more naturally emulate traditional pencil-and-paper drawing, the system can also sense the force with which a user presses digitizing pen 102 against writing surface 101. For example, digitizing pen 102 may contain means for measuring the writing force, and may communicate the force information to computer 100 by radio signals or other means. Computer 100 may incorporate the force information into its drawing display, for example by displaying a wider line when the pen force is high than when the pen force is low. A user can then make bold drawing strokes by pressing digitizing pen 102 firmly against writing surface 101, and lighter drawing strokes by pressing less firmly, just as the user would do when using a pencil and paper.

Component and manufacturing variations can cause one pen to perform differently than another pen, with the same computer 100. For example, the force sensing element of one pen, often called a "tip switch", may require a writing force of 15 grams before it signals that the pen and writing surface 101 have come in contact, while another pen may not register contact until the writing force is 20 grams. The two pens may also give different readings at other forces as well, causing the system to produce different results. For example, one pen may produce a very bold line when pressed against writing surface 101 with a force of 75 grams, while another pen may produce a narrow line when pressed against writing surface 101 with the same force.

It is desirable that different pens and devices perform consistently so that a particular device produces similar results for a particular user regardless of which pen is used. Inconsistent results may arise with other pen-enabled electronic devices as well, such as personal digital assistants, pen-enabled notebook computers, or other devices.

SUMMARY OF THE INVENTION

A system for calibrating a digitizing pen applies a known actual pen force to a tip of the digitizing pen, infers an indicated pen force from a pen force signal sent by the digitizing pen, and computes a correction, based on the actual and indicated pen forces, to be applied to a future indicated force reading.

DETAILED DESCRIPTION

Figure 2:
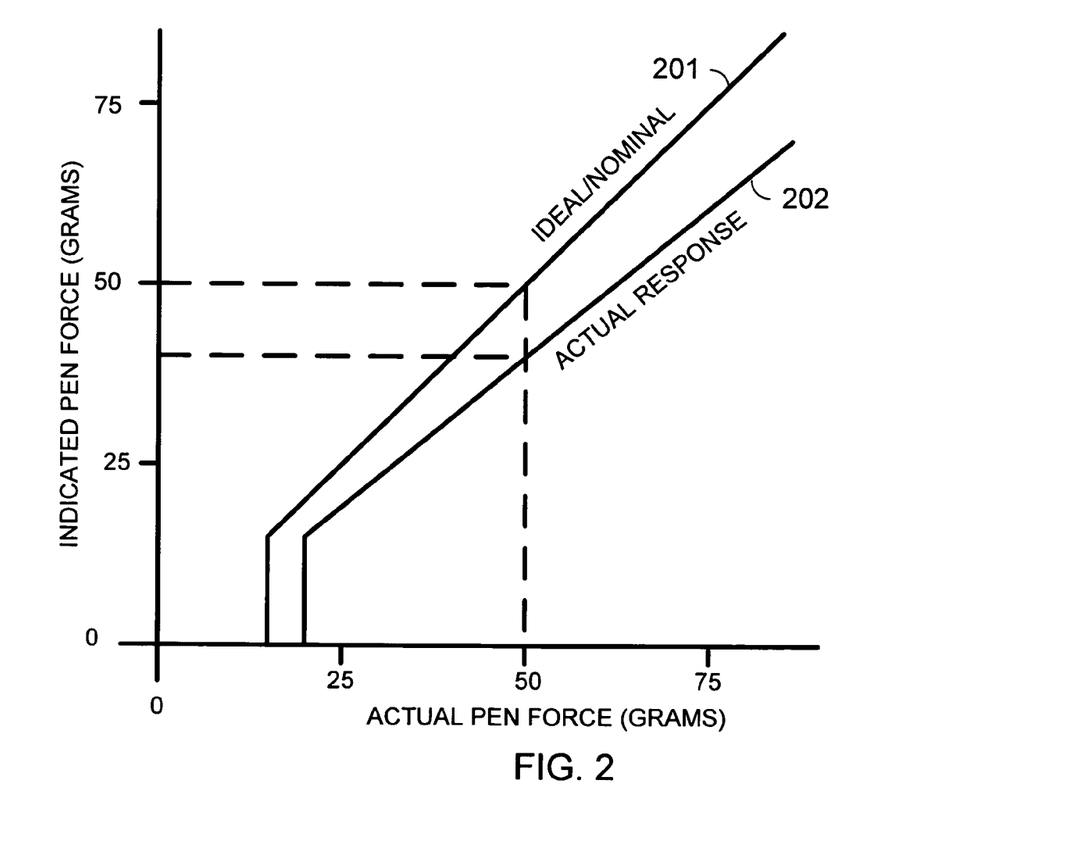
FIG. 2 illustrates graphically the effect of an inaccurate pen force signal.

FIG. 2 illustrates graphically the effect of an inaccurate pen force signal. Curve 201 shows the response of an ideal, or nominal, pen and device pair. Ideally, for each actual force with which the pen is pressed against the writing surface, the system reads the force correctly because the pen emits the proper pen force signal and the device interprets the signal correctly. In the example of curve 201 in FIG. 2, an actual pen force of 50 grams results in an inferred force reading of 50 grams.

Methods of generating the pen force signal and communicating it to the computer are known in the art. In one arrangement, the pen emits a radio signal whose frequency is a function of the writing force. The device senses the frequency of the radio signal and infers the writing force based on a pre-determined calibration. Alternatively, the pen force signal may be transmitted to the electronic device through a cable.

However, due to component and manufacturing variations, a particular pen may produce an incorrect force signal, or the device may interpret the signal incorrectly, or both. In FIG. 2, this situation is illustrated by curve 202. If the actual system response is as shown by example curve 202 in FIG. 2, an actual pen force of 50 grams will be interpreted as only 40 grams. The system may behave differently with other pens, some requiring more actual force and some requiring less actual force to produce the result expected from a force of 50 grams.

Figure 3:
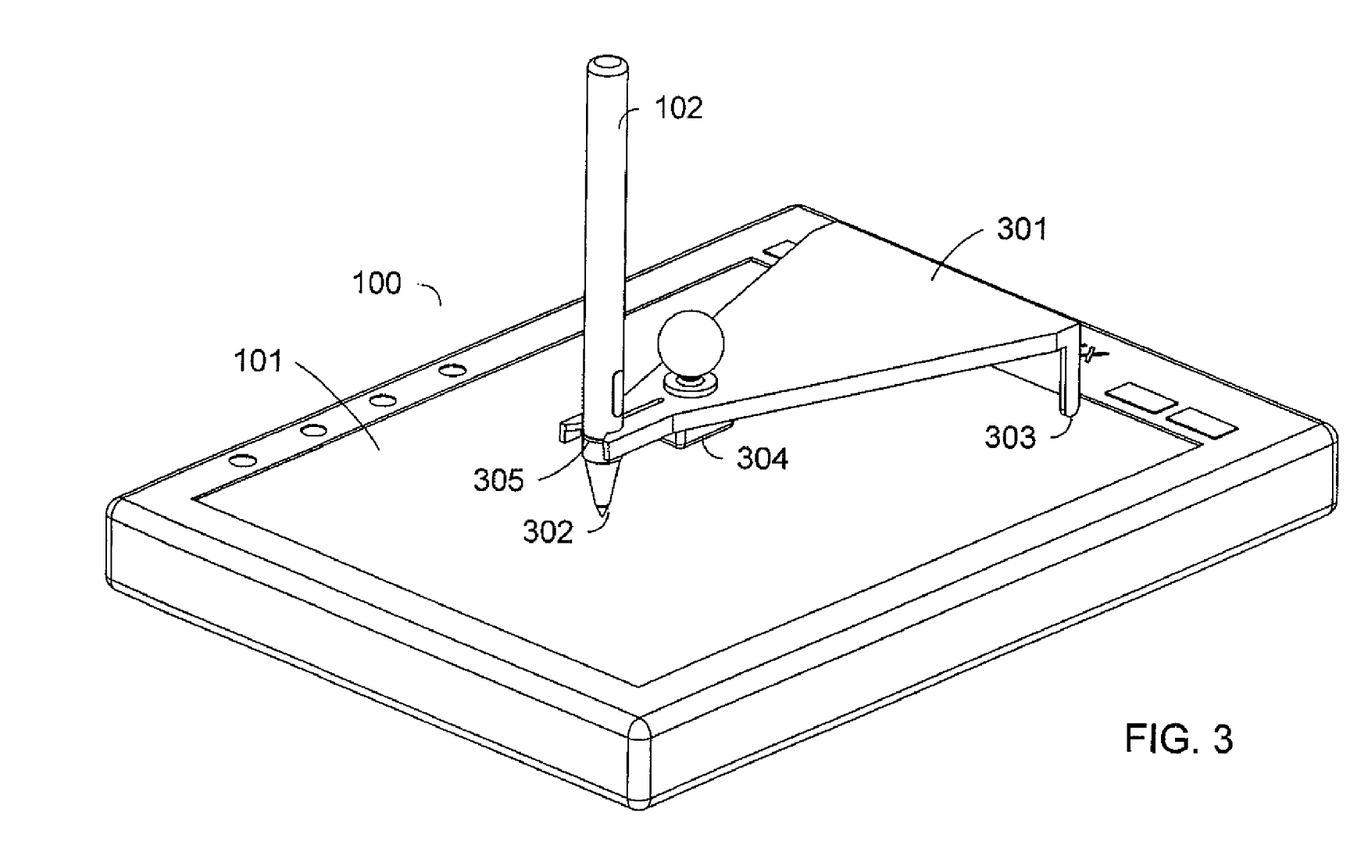
FIG. 3 depicts an apparatus, in accordance with an example embodiment of the invention, for calibrating an electronic device and a particular digitizing pen.

FIG. 3 depicts an apparatus, in accordance with an example embodiment of the invention, for calibrating an electronic device and a particular digitizing pen. Weighted cradle 301 is placed on writing surface 101 of tablet computer 100. Cradle 301 holds pen 102 in a generally upright orientation with pen tip 302 against writing surface 101. Example cradle 301 snaps around pen 102 and is supported by a ridge 305 formed into pen 102. Other holding mechanisms may be used as well.

A fulcrum end 303 of cradle 301 also rests on writing surface 101. Cradle 301 holds a weight 304, selected and positioned to provide a predetermined downward force on pen tip 302. The exact weight and placement required of weight 304 depends on the weight of pen 102, the desired downward force, and the weight and shape of cradle 301, and can be determined using well known principles of statics. For example, if pen 102 weighs 8 grams, and it is desired to provide a calibrating force of 75 grams on pen tip 302, then cradle 301 and weight 304 must provide an additional downward force of 67 grams. Assuming that the weight of cradle 301 imparts 1 gram of downward force on pen 102, then the remaining 66 grams may be provided, for example, if weight 304 weighs 88 grams and is positioned three quarters of the horizontal distance between fulcrum end 303 and pen tip 302. A weight of 88 grams may be provided, for example, by approximately 11,200 cubic millimeters of iron, or by approximately 4,600 cubic millimeters of tungsten, or by amounts other suitable materials, singly or in combination.

Once the components are arranged as in FIG. 3, a calibration routine is run on computer 100. Pen 102 emits a pen force signal, from which computer 100 infers an indicated pen force. The indicated pen force is compared with the actual pen force (75 grams in the example case), and a correction is computed for future pen force readings. Either an additive or a multiplicative method can provide an approximate correction. For example, in an additive method, if the indicated pen force is 61 grams when the known actual pen force is 75 grams, the calibration routine may determine that a correction of 14 grams should be added to all force readings during normal use to correct for the inaccuracy of the system. Of course, the value to be added to a force reading may be negative, having the effect of correcting for a indicated force reading that is higher than the actual force. Alternatively, in a multiplicative method, the calibration routine may determine that all force readings should be multiplied by the ratio of the actual to the indicated force, 75/61 in the example above, in order to correct for the inaccuracy of the system. The correction is preferably performed by logic in computer 100.

While the forces are described here using grams as the measuring unit, the system may use any other convenient measuring units. For example, the forces may be measured traditional force units such as ounces or Newtons, or may be measured in indirect units, such as a voltage produced by the sensing element of pen 102.

While pen 102 and cradle 301 are preferably placed on writing surface 101 as shown in FIG. 3, other arrangements are possible. For example, fulcrum end 303 may rest elsewhere on computer 100, outside the area of writing surface 101, or even on a table or other surface near computer 100. Similarly, pen tip 302 may rest on a different part of computer 100, or even on a nearby surface that is not part of computer 100, so long as pen 102 is near enough to computer 100 that the pen force signal is readable by computer 100.

Figure 4:
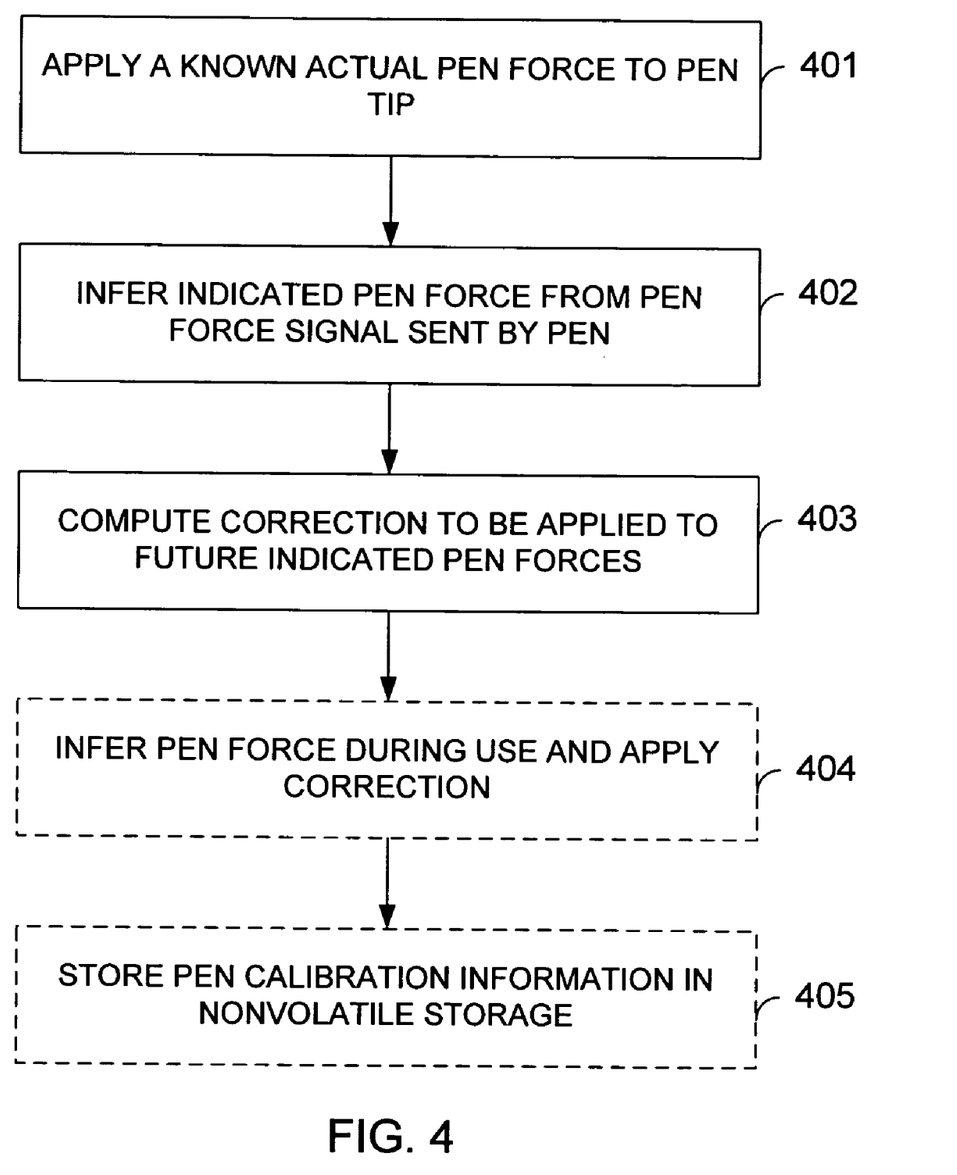
FIG. 4 depicts a flowchart of the steps involved in performing a calibration using the example arrangement of FIG. 3.

FIG. 4 depicts a flowchart of the steps involved in performing a calibration using the example arrangement of FIG. 3. At step 401, a known actual pen force is exerted on pen tip 302. At step 402, an indicated pen force is inferred from a pen force signal sent by pen 102. At step 403, a correction is computed. At optional step 404, the correction is applied to a pen force inferred during actual use of pen 102. The fact that step 404 is optional is indicated by using broken lines to form the outline of the process block in the flow chart. At optional step 405, the resulting pen calibration information is stored for later use. The pen calibration information comprises at least a description of the correction computed in step 403. The description of the correction may be, for example, the value to be added to or multiplied by an indicated force reading to correct it. While some calibration information is stored in at least a temporary way while computer 100 is in operation so that the pen force correction can be applied, the storage at step 405 is in nonvolatile storage, so that the information is available after computer 100 has been shut off and turned back on again. The nonvolatile storage may be a magnetic or optical disk, a flash memory, an electrically eraseable programmable read only memory (EEPROM), or some other kind of nonvolatile storage. Some variation is possible in the ordering of the steps of FIG. 4. For example, step 405 may be performed before step 404.

Figure 5:
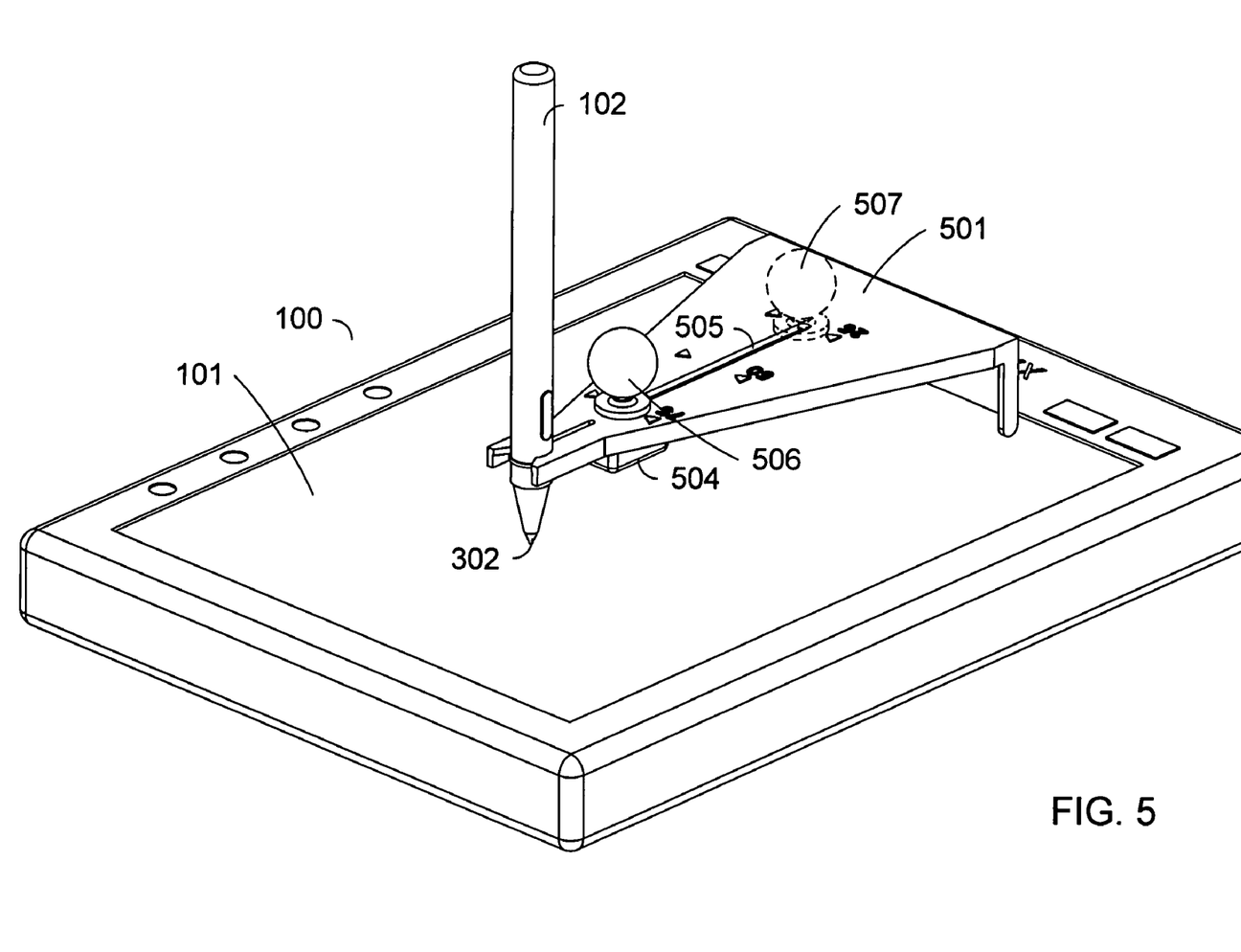
FIG. 5 shows an apparatus, in accordance with a second example embodiment of the invention, for calibrating an electronic device and a particular digitizing pen.

FIG. 5 shows an apparatus, in accordance with a second example embodiment of the invention, for calibrating an electronic device and a particular digitizing pen. Cradle 501 rests on writing surface 101 of computer 100, and holds pen 102 so that pen tip 302 rests against writing surface 101. Cradle 501 comprises a fulcrum end 503, shown also resting on writing surface 101. A weight 504 is held by cradle 501. A force is exerted by pen tip 302 against writing surface 101, the magnitude of the force depending on the weight of pen 102, the weight and shape of cradle 501, and the weight and position of weight 504. Many other positioning arrangements are possible, so long as the pen force is controlled and pen 102 is close enough to computer 100 that a pen force signal generated by pen 102 is receivable by computer 100.

Cradle 501 comprises a slot 505, enabling the position of weight 504 to be adjusted. In this way, the known force exerted on pen tip 302 can be adjusted. Weight 504 and knob 506 can slide along slot 505. For example, in FIG. 5, weight 504 is positioned so that a force of 75 grams is exerted on pen tip 302. When knob 506 is in alternate position 507, shown by broken lines, the pen force exerted is 25 grams. The positions of weight 504 that will produce specific desired pen forces can be determined using well known principles of statics.

Using indicated force measurements with two or more different actual forces, the calibration routine can compute a unique correction to be applied for any value of the indicated force. The multipoint correction may be more accurate than the single-point correction described above.

Figure 6:
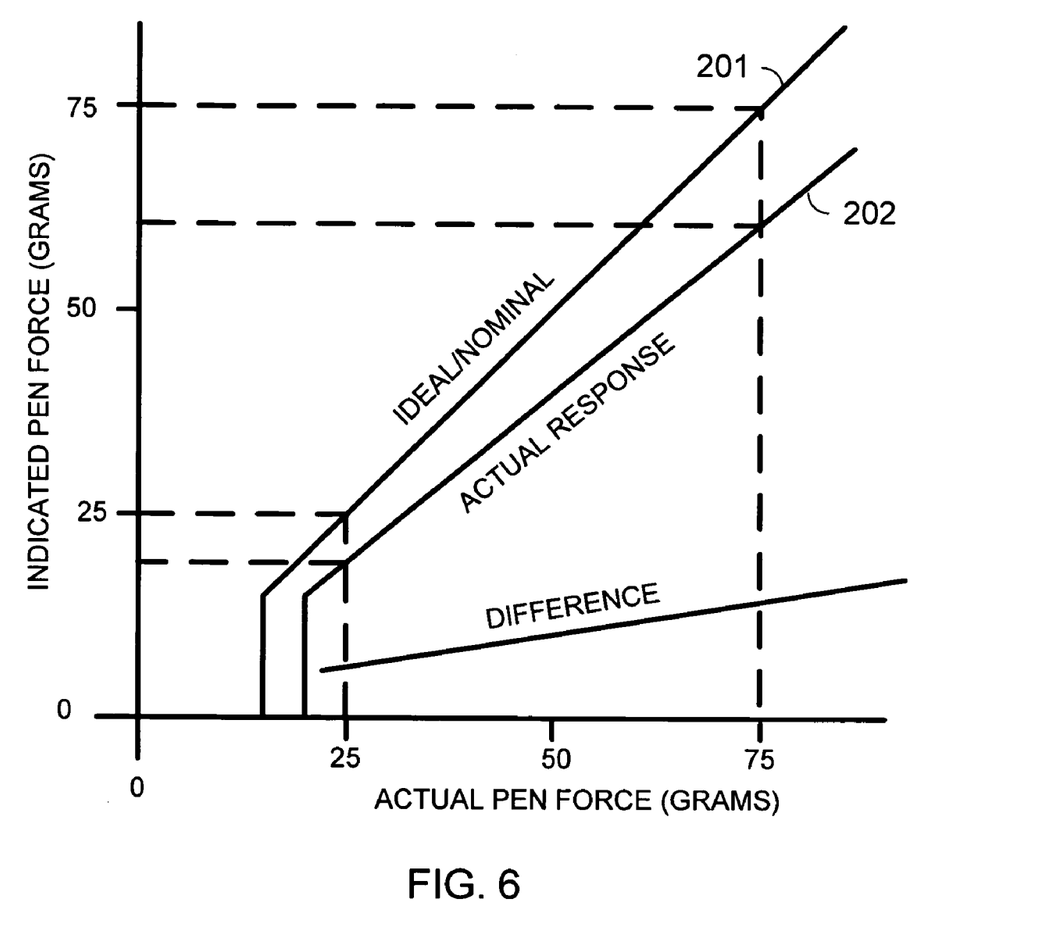
FIG. 6 illustrates the determination of a multipoint correction for pen calibration.

FIG. 6 illustrates the determination of the multipoint correction. Using the example response curves 201 and 202 from FIG. 2, the following data are obtained:

| Actual Force | Indicated Force | Difference |
|---|---|---|
| 25 g | 19 g | 6 g |
| 75 g | 61 g | 14 g |

Computing the equation of a line through these two measurements gives approximately:

Difference=0.19*Indicated Force+2.4 grams

In an example method of performing the calibration, a calibration routine running on computer 100 prompts the user to configure pen 102, cradle 501, and weight 504 to provide a first actual pen force on pen tip 302. The user indicates when this has been done, and indicates to computer 100 using a button, key, or other input device, that the first actual force is present. Computer 100 infers an indicated force from a pen force signal emitted by pen 102, and then prompts the user to configure pen 102, cradle 501, and weight 504 to provide a second actual pen force. When the user signals that this has been done, computer 100 infers an indicated pen force, and then computes the coefficients of a line that is a linear approximation of the difference between the actual and indicated force values as a function of the indicated force. In normal operation, computer 100 can then use these coefficients to compute a correction to be added to any indicated force reading. Once a particular pen and computer have been calibrated in this way, the writing "feel" is substantially identical to the "feel" of any other pen that has been calibrated with the particular computer.

While a linear approximation for the correction is likely sufficient, higher-order functions may be used as well. For example, the system may measure the difference between the indicated and actual pen forces at three known actual forces, and then compute a quadratic difference function that incorporates the three pairs of actual and indicated force readings.

Figure 7:
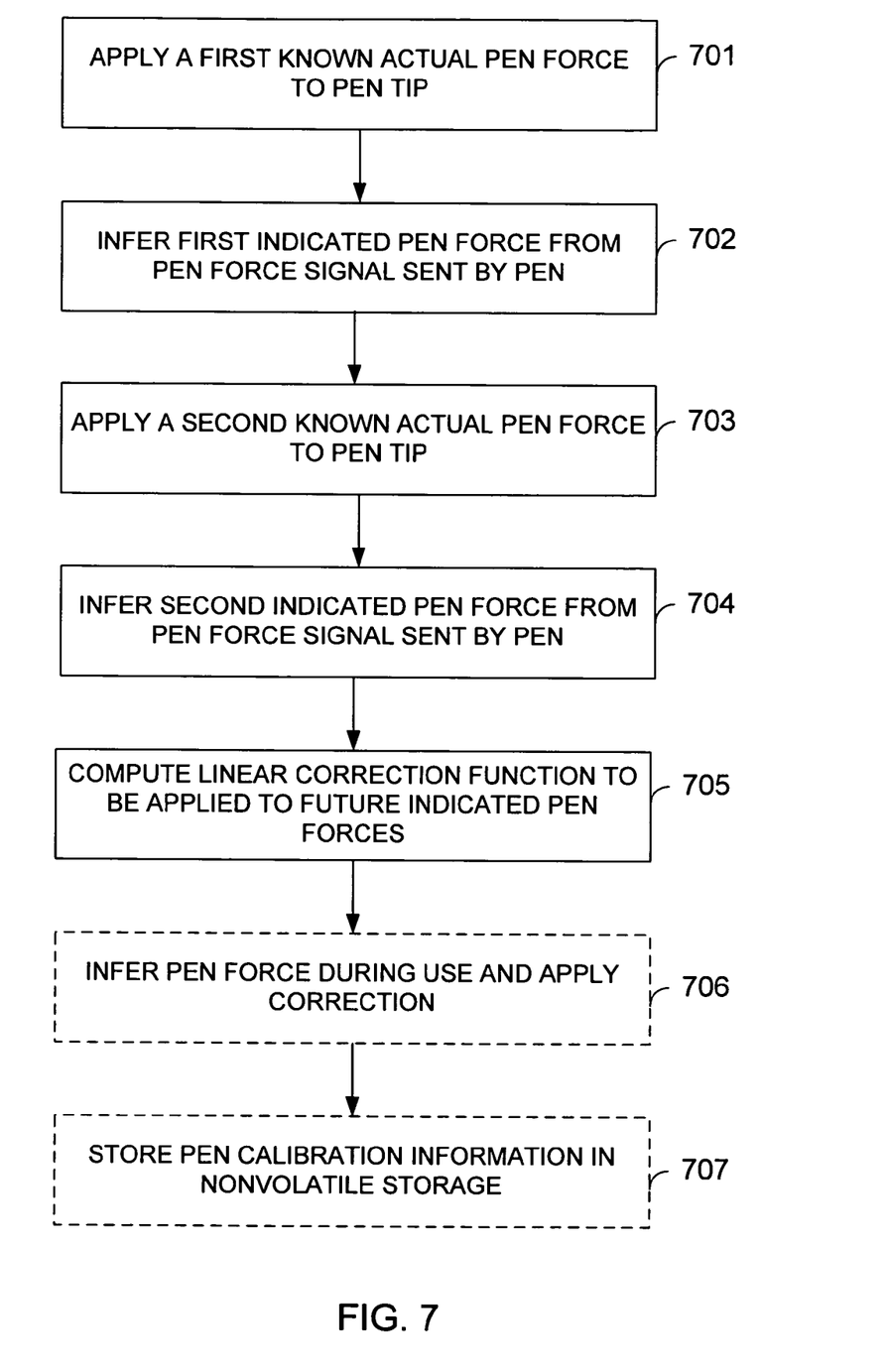
FIG. 7 depicts a flowchart of the steps involved in performing a calibration using the example arrangement of FIG. 5.

FIG. 7 depicts a flowchart of the steps involved in performing a calibration using the example arrangement of FIG. 5. At step 701, a first known actual pen force, for example 75 grams, is applied to pen tip 302. At step 702, computer 100 infers an indicated pen force from a pen force signal sent by pen 102. At step 703, a second known actual pen force, for example 25 grams, is applied to pen tip 302. At step 704, a second indicated pen force is inferred from the pen force signal. At step 705, a linear correction function is computed. At optional step 706, the correction is applied during actual use of computer 100. At optional step 707, the pen calibration information, comprising at least the correction computed in step 705, is stored in nonvolatile storage so that it is available after computer 100 has been shut off and turned back on.

In accordance with another example embodiment of the invention, an electronic device re-uses stored calibration information. For example, after the calibration is complete, the electronic device may prompt the user for an identifier that uniquely identifies the pen just calibrated. The calibration result and the identifier are stored in a data file on the electronic device. A later user of the electronic device may be presented with a list of pen calibration information sets that are available for use, and may select the one already stored for the particular pen the user wishes to use. In this way a particular electronic device may be used with different pens, with consistent pen "feel", while requiring only one calibration operation for each pen. The list of available pen calibration information files may be presented to the user, for example, on power-up of the device, at a login of a user, or upon demand, as when a user launches the application program. Alternatively, the device may use default pen calibration information at power-up or at a login of a user, and present the list of available pen calibrations upon demand. The default pen calibration information may, for example, be the pen calibration information for the most recently selected pen, or for the pen most recently selected by the user who logs in.

Figure 8:
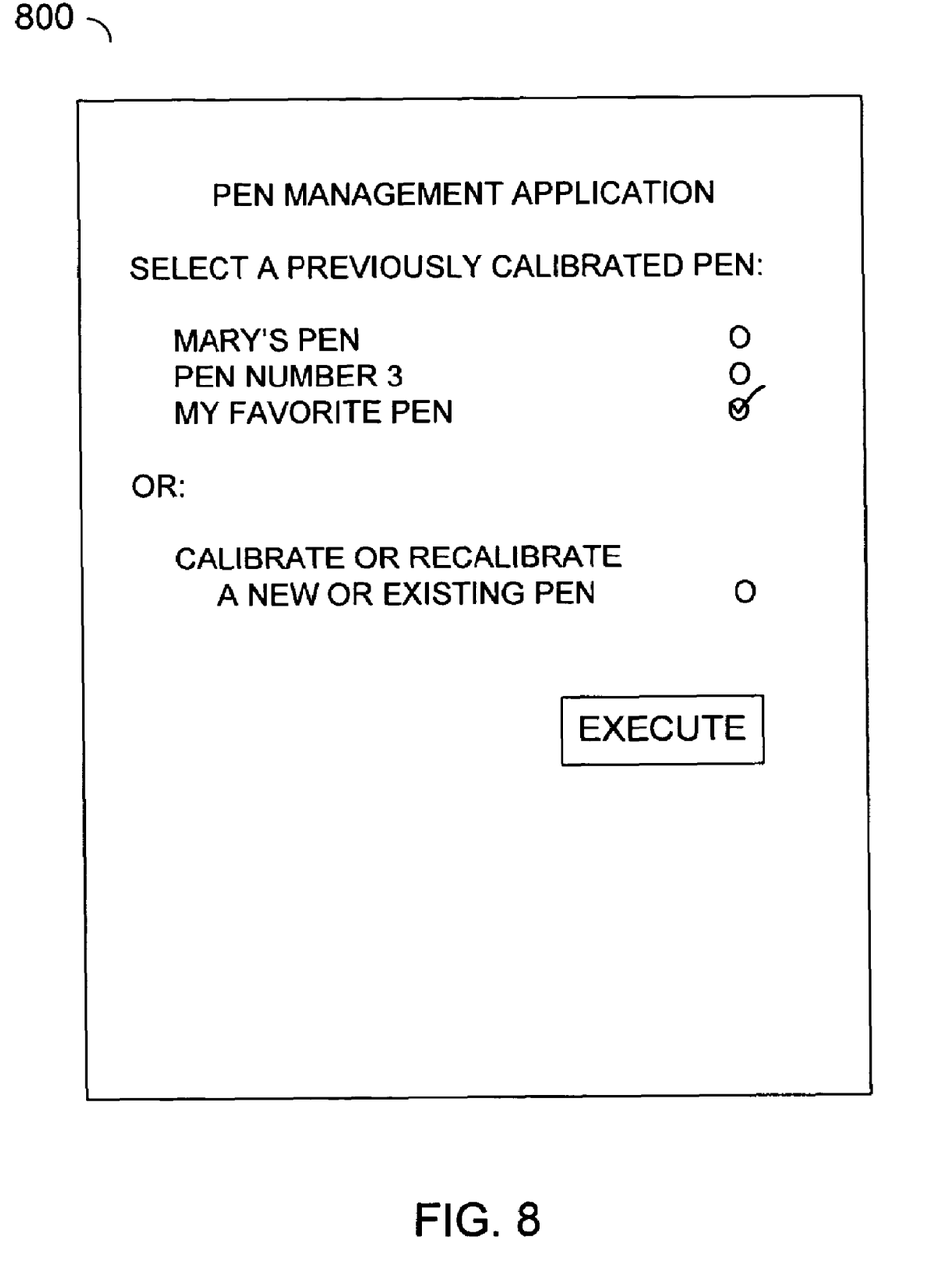
FIG. 8 depicts an example screen displayed by a pen management application program executing on a tablet computer.

FIG. 8 depicts an example screen 800 displayed by a pen management application program executing on tablet computer 100. In using the pen management application program, the user selects the pen the user wishes to use from a list of previously calibrated pens, or indicates that a new pen calibration is to be run. Pressing "EXECUTE", preferably with the pen being used, causes the indicated pen calibration information to be used, or causes a new calibration to begin.

Figure 9:
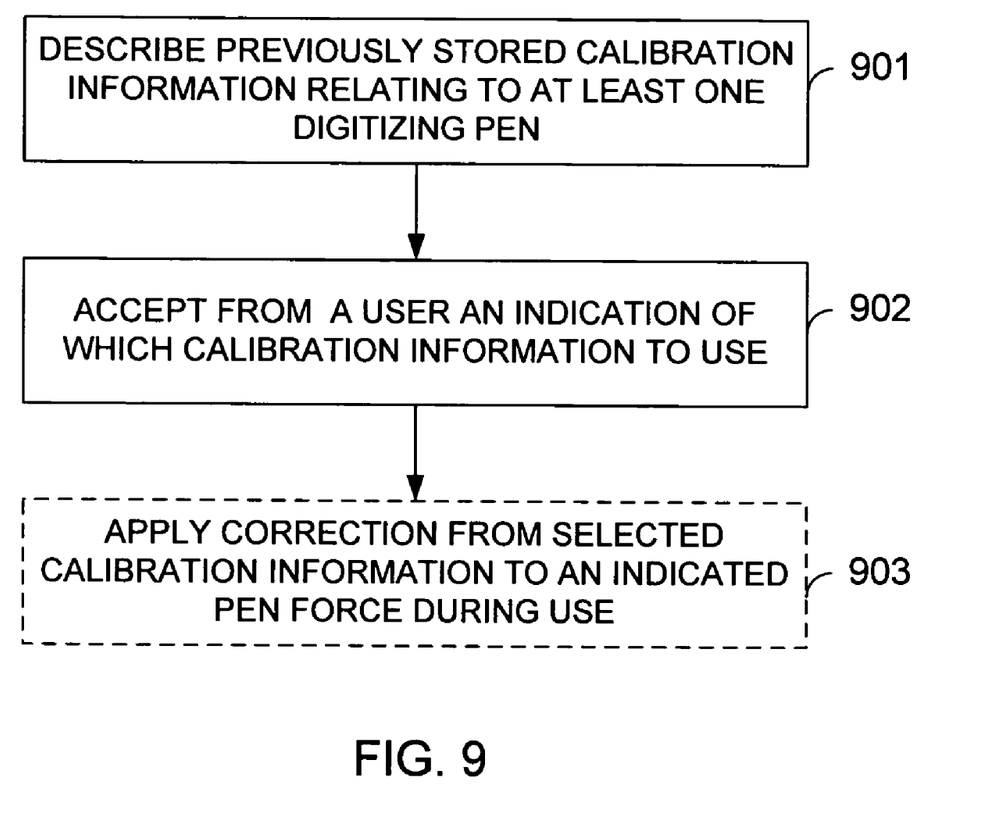
FIG. 9 depicts a flowchart of steps involved in managing pen calibration information using the application shown in FIG. 8.

FIG. 9 depicts a flowchart of steps involved in managing pen calibration information using the application shown in FIG. 8. At step 901, previously stored sets of calibration information, relating to at least one digitizing pen, are described. At step 902, an indication is accepted from a user as to which calibration information to use in correcting pen force readings. At optional step 903, a correction from the calibration information is applied to an indicated pen force during use of the system.

While the pen calibration method and apparatus have been described in conjunction with a tablet computer, the system is equally applicable to calibrate other kinds of electronic devices and pens. For example, a personal digital assistant (PDA) is a portable electronic device typically used for storing information useful for personal organization, such as telephone lists, addresses, and an appointment calendar. Information is often entered into a PDA using a stylus or pen. A PDA with a force-sensitive pen may comprise a calibration system in accordance with an example embodiment of the invention.

Similarly, the invention may be embodied using a pen-enabled notebook computer. A pen-enabled notebook computer differs from a tablet computer in that the pen-enabled notebook computer uses a keyboard as its primary data input device, but also enables pen-based data input on a display screen.

The invention claimed is:

1. A system for calibrating a digitizing pen, comprising:
   means for applying a known actual pen force to a tip of the digitizing pen;
   means for inferring an indicated pen force from a pen force signal sent by the digitizing pen; and
   means for computing a correction, based on the actual and indicated pen forces, to be applied to a future indicated pen force.

2. The system of claim 1, further comprising means for applying the correction to a second indicated pen force.

3. The system of claim 1, further comprising means for storing pen calibration information in a nonvolatile storage medium.

4. The system of claim 3, further comprising means for selecting a particular set of pen calibration information from a list of stored sets of pen calibration information.

5. A system for calibrating a digitizing pen, comprising:
   a digitizing pen that emits a pen force signal indicative of a force on a tip of the pen;
   means for applying a known actual force to the pen tip;
   an electronic device that infers an indicated pen force from the pen force signal and computes a correction, to be applied to a future indicated force reading, from the indicated pen force and the known actual force.

6. The system of claim 5, wherein the pen force signal is emitted wirelessly from the pen.

7. The system of claim 5, wherein the pen force signal is transmitted to the electronic device through a wire.

8. The system of claim 5, wherein the means for applying a known actual force comprises a weighted cradle that holds the pen tip against a surface.

9. The system of claim 8, wherein the surface is a surface of the electronic device.

10. The system of claim 8, wherein the surface is a writing surface on the electronic device.

11. The system of claim 5, wherein the electronic device is a tablet computer.

12. The system of claim 5, wherein the electronic device is a pen-enabled notebook computer.

13. The system of claim 5, wherein the electronic device is a personal digital assistant.

14. The system of claim 5, wherein the correction is a numerical value to be added to a future indicated force reading.

15. The system of claim 5, wherein the correction is a factor by which to multiply a future indicated force reading.

16. The system of claim 5, further comprising means for applying a second known actual force to the pen tip, and wherein the electronic device infers a second indicated pen force, and computes the correction from the two known actual forces and the two indicated pen forces.

17. The system of claim 16, wherein the correction is a linear approximation of a difference between the actual and indicated force values as a function of the indicated force.

18. The system of claim 5, wherein the electronic device stores calibration information, comprising at least a description of the computed correction, in nonvolatile storage.

19. The system of claim 18, wherein the calibration information is associated with an identifier that uniquely identifies the pen.

20. A system for managing pen calibration information, comprising an electronic device capable of storing multiple sets of pen calibration information, and wherein the electronic device performs the following method:
    presenting to a user of the electronic device a list of available sets of pen calibration information; and
    accepting from the user an indication of which set of pen calibration information to use.

21. The system of claim 20, wherein the method further comprises:
    applying a correction comprised in the selected set of pen calibration information to an indicated pen force reading.

22. The system of claim 20, wherein the method is performed upon power-up of the electronic device.

23. The system of claim 20, wherein the method is performed when a user logs into the electronic device.

24. The system of claim 20, wherein the method is performed when the user launches an application program configured to perform the method.

25. The system of claim 24, wherein a default set of pen calibration information is used upon power-up of the electronic device.

26. The system of claim 24, where a default set of pen calibration information is used when a user logs into the electronic device.

27. A method of calibrating a digitizing pen, comprising:
    applying a known actual force to a tip of the pen;
    inferring an indicated pen force from a pen force signal emitted from the pen; and
    computing a correction, to be applied to future indicated pen force readings, from the actual force and the indicated force reading.

28. The method of claim 27, further comprising applying the correction to a second indicated pen force reading.

29. The method of claim 27, wherein applying a known actual force to the pen tip further comprises mounting the pen in a weighted cradle that holds the pen tip against a surface.

30. The method of claim 29, wherein the surface is a surface of an electronic device with which the pen is to be used.

31. The method of claim 29, wherein the surface is a writing surface of an electronic device with which the pen is to be used.

32. The method of claim 27, wherein computing a correction further comprises computing a difference between the actual force and the indicated force reading.

33. The method of claim 27, wherein computing a correction further comprises computing a ratio of the actual force to the indicated force reading.

34. The method of claim 27, further comprising storing pen calibration information, comprising at least a description of the correction, in nonvolatile storage.

35. The method of claim 27, further comprising:
    applying a second known force to the pen tip; and
    inferring a second indicated force reading from the pen force signal;
    and wherein computing a correction comprises computing a linear approximation of a difference between the actual and indicated force values as a function of the indicated force.

36. A method of managing pen calibration information, comprising:
    describing multiple, previously stored sets of calibration information, each of the sets comprising a description of a correction to be applied to an indicated force reading, relating to at least one digitizing pen; and
    accepting, from a user of the electronic device, an indication of which set of calibration information to use.

37. The method of claim 36, further comprising using the selected set of calibration information by applying the correction to an indicated force reading.

* * * * *